US009408040B2

(12) United States Patent
Cooper et al.

(10) Patent No.: US 9,408,040 B2
(45) Date of Patent: Aug. 2, 2016

(54) SYSTEMS AND METHODS FOR ROOM-LEVEL LOCATION USING WIFI

(71) Applicants: Matthew L. Cooper, San Francisco, CA (US); Jacob Biehl, San Jose, CA (US)

(72) Inventors: Matthew L. Cooper, San Francisco, CA (US); Jacob Biehl, San Jose, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 442 days.

(21) Appl. No.: 13/767,719

(22) Filed: Feb. 14, 2013

(65) Prior Publication Data

US 2014/0226503 A1     Aug. 14, 2014

(51) Int. Cl.
| | |
|---|---|
| *H04W 4/04* | (2009.01) |
| *G01S 5/02* | (2010.01) |
| *H04W 4/02* | (2009.01) |
| *G01S 5/10* | (2006.01) |

(52) U.S. Cl.
CPC .............. *H04W 4/043* (2013.01); *G01S 5/021* (2013.01); *G01S 5/0252* (2013.01); *G01S 5/0257* (2013.01); *G01S 5/0278* (2013.01); *G01S 5/0284* (2013.01); *G01S 5/10* (2013.01); *H04W 4/025* (2013.01); *H04W 4/028* (2013.01)

(58) Field of Classification Search
None
See application file for complete search history.

(56) References Cited

U.S. PATENT DOCUMENTS

| | | | |
|---|---|---|---|
| 7,933,612 B2 | 4/2011 | Counts et al. | |
| 2002/0132624 A1* | 9/2002 | Watanabe | G01S 5/14 455/456.1 |
| 2008/0261622 A1* | 10/2008 | Lee | G01S 5/0205 455/456.2 |
| 2012/0129546 A1* | 5/2012 | Yang et al. | 455/456.1 |
| 2012/0264447 A1* | 10/2012 | Rieger, III | G01S 5/0252 455/456.1 |
| 2013/0260781 A1* | 10/2013 | Un et al. | 455/456.1 |

OTHER PUBLICATIONS

Bolliger, Redpin-Adaptive, Zero-Configuration Indoor Localization through User Collaboration, Institute for Pervasive Computing, 2008, 6 pgs.
Chintalapudi, Indoor Localization Without the Pain, Microsoft Research India, 2010, 12 pgs.
Damerau, A Technique for Computer Detection and Correction of Spelling Errors, IBM Corporation, vol. 7, No. 3, Mar. 1964, 6 pgs.
Dempster, Errors in Determinstic Wireless Fingerprinting Systems for Localisation, School of Surveying and Spatial Information Systems, University of New South Wales, 2008, 5 pgs.
Freund, A Decision-Theoretic Genaralization of On-Line Learning and an Application to Boosting, Journal of Computer and System Sciences 55, 1997, 21 pgs.

(Continued)

*Primary Examiner* — Joshua A Kading
(74) *Attorney, Agent, or Firm* — Morgan, Lewis & Bockius LLP

(57) ABSTRACT

A method of identifying a location of a mobile device in a building includes identifying non-overlapping regions in a building. A server collects base station signal strength measurements at a plurality of distinct points in the building, with at least one point in each region. The server trains region classifiers for each region. Each region classifier is configured to compute a probability estimate that the test point is inside the region, using inputs that are signal strength differences. The server receives signal strength measurements from the base stations, taken by a mobile device at an unknown point. The server computes differences in signal strengths between pairs of base stations, and applies the region classifiers to the signal strength differences, thereby estimating the region where the mobile device is located. The server then transmits the estimated region to a user.

21 Claims, 11 Drawing Sheets

(56) References Cited

OTHER PUBLICATIONS

Indyk, Approximate Nearest Neighbor Under Edit Distance via Product Metrics, Assoc. for Computing Machinery, Inc. and the Society for Industrial and Applied Mathematics, 2004, 5 pgs.
Li, Robust LogitBoost and Adaptive Base Class (ABC) LogitBoost, Dept. of Statistical Science Faculty of Computing and Information Science, Cornell University, 2010, 10 pgs.
Lin, Enhanced Indoor Locationing in a Congested Wi-Fi Environment, Carnegie Mellon Silicon Valley, Mar. 2009, 16 pgs.
Madigan, Bayesian Indoor Positioning Systems, Rutgers University, 2005, 11 pgs.
Martin, Precise Indoor Localization Using Smart Phones, 2010, 4 pgs.
Mukherjee, A Theory of Multiclass Boosting, Princeton University, Dept. of Computer Science, 2010, 9 pgs.
Ouyang, Indoor Location Estimation with Reduced Calibration Exploiting Unlabeled Data via Hybrid Generative/Discriminative Learning, IEEE Transactions on Mobile Computing, vol. 11, No. 11, Nov. 2012, 14 pgs.
Pan, Tracking Mobile Users in Wireless Networks via Semi-Supervised Colocalization, IEEE Transactions on Pattern Analysis and Machine Intelligence, vol. 34, No. 3, Mar. 2012, 14 pgs.
Roxin, Survey of Wireless Geolocation Techniques, version 1-3, Apr. 2010, 9 pgs.
WIPSWiFi-based Indoor Positioning System, Internet Archive Wayback Machine, http://web.archive.org/web/20100324113836/http://scyp.atrc.utoronto.ca/projects/wips, J. Silva, Mar. 24, 2010, 1 pg.
Youssef, The Horus WLAN Location Determination System, Dept. of Computer Science, University of Maryland, 2004, 14 pgs.
Zhang, Modeling Interactions from Email Communication, IDIAP Research Institute and Ecole Polytechnique Federale de Lausanne (EPFL) Switzerland, Massachusetts Inst. of Technology, 2006, 4 pgs.

\* cited by examiner

Classifiers 228

| | region_id (404) | coefficient (456) | station_id1 (458) | station_id2 (460) | threshold (462) |
|---|---|---|---|---|---|
| 502 | 123 | 0.15 | A | D | 21 |
| 504 | 123 | 0.12 | A | F | 15 |
| 506 | 123 | 0.08 | A | G | 17 |
| 508 | 123 | 0.03 | B | F | 8 |
| 510 | 217 | 0.22 | A | C | 25 |
| 512 | 217 | 0.13 | A | D | 13 |
| 514 | 217 | 0.09 | B | D | 11 |

Figure 5A

| | station_id (414) | signal strength (524) |
|---|---|---|
| 526 | A | -34 dbm |
| 528 | B | -42 dbm |
| 530 | C | -65 dbm |
| 532 | D | -50 dbm |
| 534 | E | -98 dbm |
| 536 | F | -72 dbm |
| 538 | G | undetected |

Figure 5B

| Region | Station Sequence |
|---|---|
| Room 315 | B A C E H D G |
| Room 332 | E C B G A |
| Unknown / Test | A B C D E F G |

* transpose A and B
* remove H
* transpose D and E
* add F

Edit distance = 4

* replace E with A
* transpose B and C
* add D
* add E
* transpose A and G
* replace A with F Edit distance = 6

Figure 6C

| station_id | Room 315 signal strength | Room 332 signal strength | Test Location signal strength |
|---|---|---|---|
| A | -55 dbm | -50 dbm | -34 dbm |
| B | -50 dbm | -44 dbm | -42 dbm |
| C | -60 dbm | -30 dbm | -65 dbm |
| D | -75 dbm | undetected | -69 dbm |
| E | -70 dbm | -20 dbm | -74 dbm |
| F | undetected | undetected | -75 dbm |
| G | -80 dbm | -47 dbm | -89 dbm |
| H | -72 dbm | undetected | undetected |

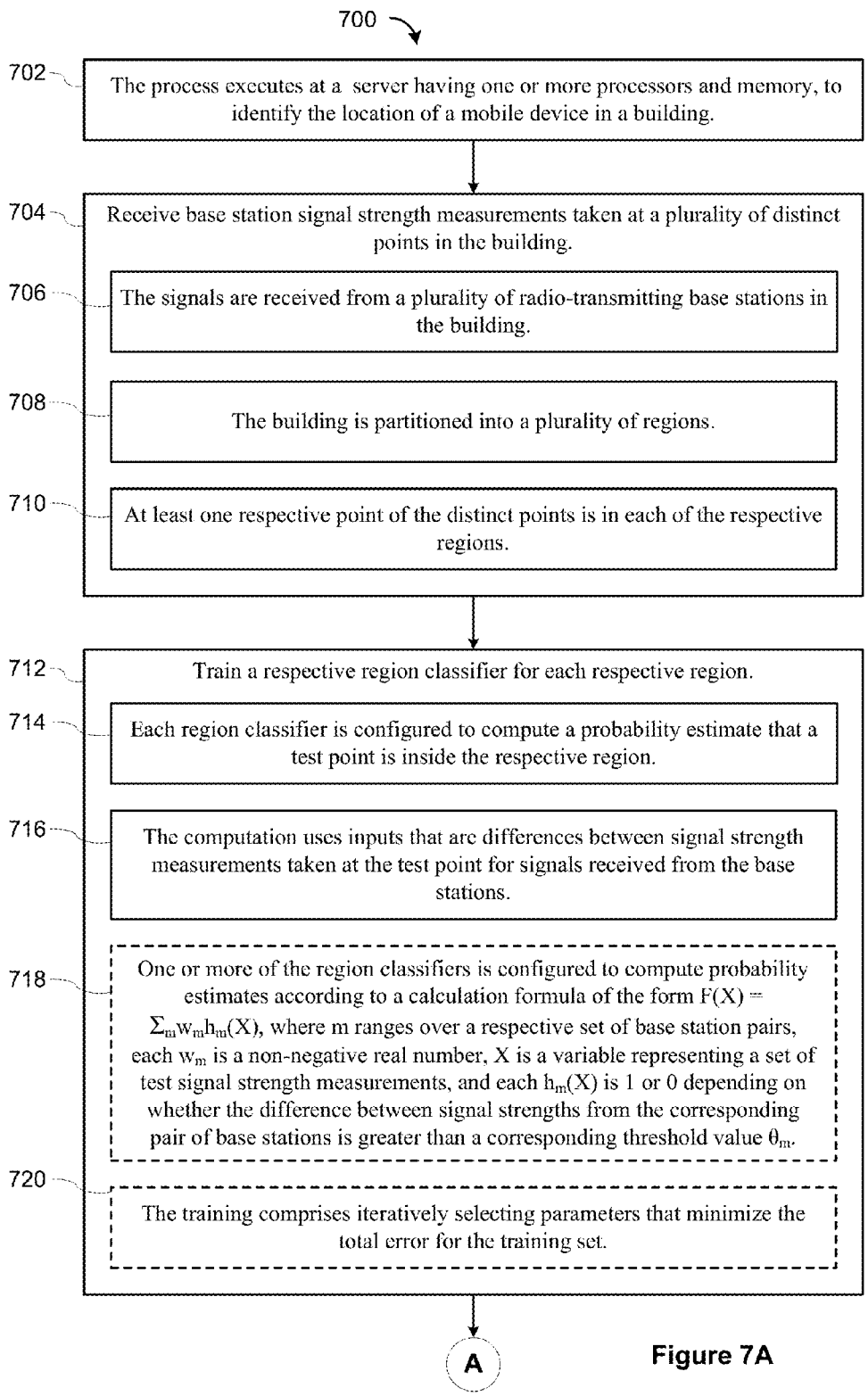

SYSTEMS AND METHODS FOR ROOM-LEVEL LOCATION USING WIFI

TECHNICAL FIELD

The disclosed implementations relate generally to determining a location of a mobile device within a specific room using combinations of WiFi signal strengths.

BACKGROUND

Effective communication is essential to enabling successful collaboration. It enables collaborators to build common ground, to foster ideas, to develop the complex interpersonal relationships that facilitate effective interactions, and more. In the modern workplace, successful collaboration translates into improved productivity, creativity, and the overall well-being of workers. An important aspect of effective communication is having ongoing group awareness, which includes knowledge of where co-workers are located.

Fostering group awareness has become an increasingly difficult challenge in today's modern workplaces. Workers may have flexible schedules (e.g., working outside the typical 9-6 workday, working in different time zones, etc.) or may work from remote locations (e.g., such as distributed work locations, client sites, at home, public places, etc.). Moreover, even when a worker is present in the same building, the worker may not be in a designated work space. Accordingly, determining group awareness of co-workers is difficult, time consuming, and error prone. Thus, it is highly desirable to provide a system and method for determining a location of a person without the aforementioned problems.

SUMMARY

To address the aforementioned deficiencies, some implementations provide a system, a computer readable storage medium including instructions, and a method for determining a location of a person. In these implementations, rooms or regions within a building are identified, and for each region or room, measurements are taken of the signal strength of detected WiFi signals.

In some implementations, the WiFi signal strengths are ordered, forming a "fingerprint" for each region or room. Later, when a mobile device is in an unknown location, the mobile device can measure the signal strengths of WiFi signals, and similarly order the signals by the strengths of the signals. This test sequence of signal strengths is compared to the known signal strength fingerprints, to determine which fingerprint is the closest match. Some implementations use "edit distance" to determine the best match, which is the smallest number of atomic operations required to transform a known fingerprint into the test sequence.

Alternatively, some implementations use the measured signal strength data to train region classifiers. Each region classifier is a function whose inputs are signal strengths at an unknown test point, and the output is a probability estimate that the unknown test point is in the region or room corresponding to the classifier. Applying each of the classifiers to the unknown test point, the region or room with the highest probability is determined to be the location of the test point. In some implementations, if there are two or more regions or rooms with similar probabilities, new test data may be collected by the mobile device, and the competing highest probability classifiers from the first round can be applied to the new test data.

In some implementations with a large number of regions or rooms, the classification is hierarchical with two or more levels of classification. The first level applies a "coarse" classification to determine the general region where the mobile device is located (e.g., what floor of a building, or what quadrant of a floor). The second level of classifiers includes only the rooms or regions that are inside the region identified by the first level. For example, in a large floor of a building with 100 rooms, the rooms could be categorized as North, South, East, and West. If the first level classification determines that the mobile device is in the West region, then only the room classifiers in the West region are applied at the second level. In some implementations, there are three or more levels of classifiers (e.g., level 1 identifies the building, level 2 identifies the floor within the designated building, level 3 identifies a region within the identified floor, and the fourth level determines the actual room).

Some implementations provide a client application that allows a person to subscribe to and to view the location of other persons in an organization. In some implementations, the user interface of the client application displays tiles for persons in the organization that indicate the presence states of the persons, including their current locations. Clicking on (or hovering over) a respective tile for a respective person causes the client application to display additional information about the respective person. For example, the additional information may include contact information, a current presence state, a user-supplied status message, and the like. The client application also includes a user interface for allowing a person to opt into allowing data feeds to monitor the presence states of the person. In doing so, the person may control what types of data are collected.

According to some implementations, a method of identifying a location of a mobile device in a building is performed at a server having one or more processors and memory. The server receives base station signal strength measurements taken at a plurality of distinct points in the building. The signals are received from a plurality of radio-transmitting base stations in the building. The building is partitioned into a plurality of regions, and at least one respective point of the distinct points is in each of the respective regions. The method includes training a respective region classifier for each respective region. Each region classifier is configured to compute a probability estimate that a test point is inside the respective region. The computation uses inputs that are differences between signal strength measurements taken at the test point for signals received from the base stations.

According to some alternative implementations, a method of identifying a location of a mobile device in a building is performed at a server having one or more processors and memory. The server receives base station signal strength measurements taken at a plurality of distinct points in the building. The signals are received from a plurality of radio-transmitting base stations in the building. The building is partitioned into a plurality of regions, and at least one respective point of the distinct points is in each of the respective regions. The server builds a respective known signal strength vector for each respective point, where the vector includes an ordered sequence of the base station identifiers, and the base station identifiers within each respective known signal strength vector are ordered by the signal strengths of the corresponding base stations as measured at the respective point. Later, the server receives signal strength measurements from at least a subset of the base stations, the measurements taken by a mobile device at an unknown point in the building. The server builds a test signal strength vector including an ordered sequence of the base station identifiers, where the base station identifiers are ordered by the corresponding signal strengths. The server then computes an edit distance between the test signal strength vector and at least a subset of the known signal strength vectors. The edit distance between a pair of signal strength vectors is the minimum number of atomic operations required to transform one of the signal strength vectors in the pair into the other signal strength vector in the pair. In some implementations, the atomic operations are: inserting a single base station identifier, removing a single base station identifier, replacing a single base station identifier with a different base station identifier, and transposing two adjacent base station identifiers. In some implementations, the edit distance between the test signal strength vector and a known signal strength vector includes a coefficient times the Euclidean distance between the test signal strength vector and a known signal strength vector. The server then selects k known signal strength vectors whose corresponding edit distances from the test signal strength vector are the smallest of the computed edit distances, where k is a positive integer. In some implementations, k=1 or k=5. The server determines a likely region where the mobile device is located based on the regions corresponding to the k known signal strength vectors, and transmits that determination to a user seeking to identify the location of the mobile device.

BRIEF DESCRIPTION OF THE DRAWINGS

FIG. 5A illustrates sample data for the Classifiers table in FIG. 4D.

FIG. 5B illustrates test measurements of WiFi signal strengths by a mobile device at some location in accordance with some implementations.

FIGS. 6A-6D illustrate a process of comparing an ordered sequence of WiFi signals to known sequences of WiFi signals in accordance with some implementations.

FIGS. 7A-7C illustrate a flowchart for determining the room or region where a mobile device is located in accordance with some implementations.

Like reference numerals refer to corresponding parts throughout the drawings.

DESCRIPTION OF IMPLEMENTATIONS

Figure 1:
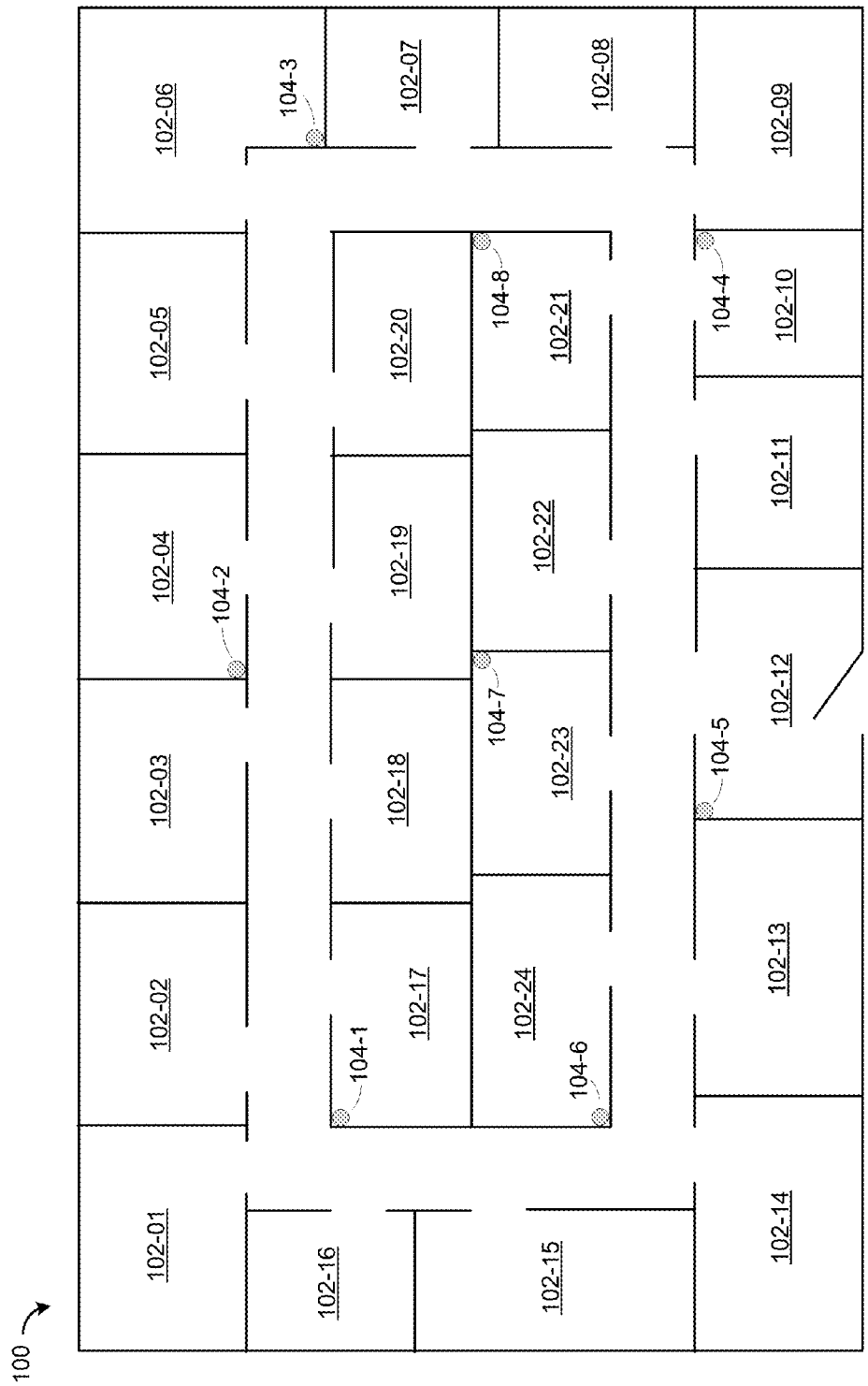
FIG. 1 illustrates a floor plan with 24 rooms/regions and 8 WiFi base stations in accordance with some implementations.

FIG. 1 illustrates an exemplary floor plan 100 of an office building in accordance with some implementations. In this illustration, there are twenty-four rooms/regions 102, labeled 102-01 to 102-24. These rooms/regions 102 may be individual offices, break rooms, meeting rooms, or a foyer region 102-12. FIG. 1 also illustrates eight distinct WiFi base stations 104, labeled 104-1 to 104-8. The base stations 104 may be part of the same or different wireless networks. As described in more detail below with respect to FIGS. 4A-D, 5AB, 6A-C, 7A-C, and 8A-C, by measuring the signal strengths of the base stations at an unknown point in the floor plan 100, disclosed implementations can estimate with high reliability in which room the unknown point is located.

Unlike previous techniques that rely on trilateration to determine coordinates for an unknown point, the disclosed implementations use information about regions/rooms to identify the most probable room.

Figure 2:
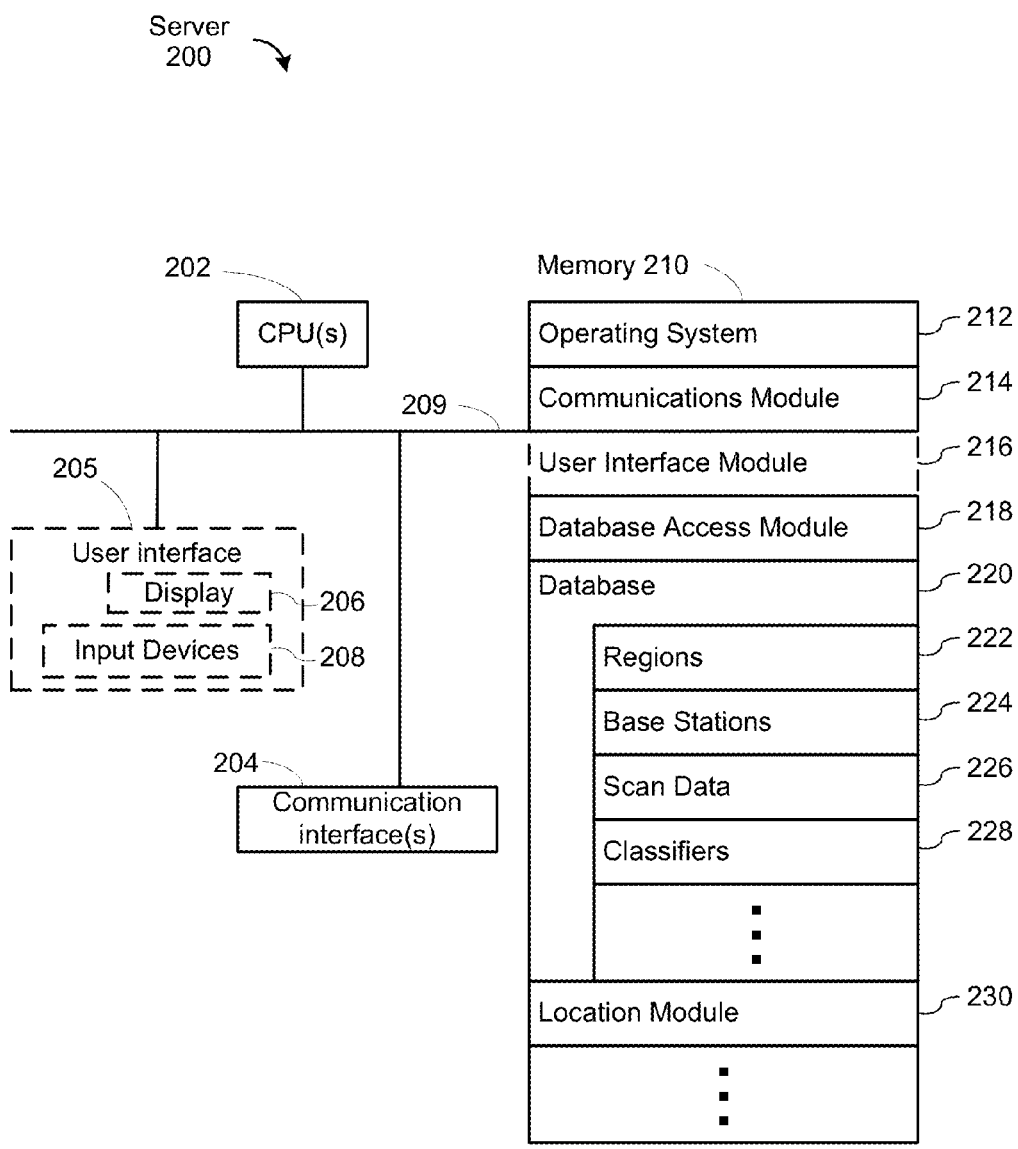
FIG. 2 is a block diagram illustrating a server 200 in accordance with some implementations.

FIG. 2 is a block diagram illustrating a server 200, according to some implementations. The server 200 typically includes one or more processing units (CPU's) 202, one or more network or other communications interfaces 204, memory 210, and one or more communication buses 209 for interconnecting these components. The communication buses 209 may include circuitry (sometimes called a chipset) that interconnects and controls communications between system components. The server 200 optionally may include a user interface 205 comprising a display device 206 and input devices 208 (e.g., keyboard, mouse, touch screen, keypads, etc.). Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from the CPU(s) 202. Memory 210, or alternately the non-volatile memory device(s) within memory 210, comprises a computer readable storage medium. In some implementations, memory 210 stores the following programs, modules, and data structures, or a subset thereof:

- an operating system 212 that includes procedures for handling various basic system services and for performing hardware dependent tasks;
- a communication module 214 that is used for connecting the server 200 to other computers via the one or more communication interfaces 204 (wired or wireless) and one or more communication networks, such as the Internet, other wide area networks, local area networks, metropolitan area networks, and so on;
- an optional user interface module 216 that receives commands from the user via the input devices 208 and generates user interface objects in the display device 206;
- a database access module 218 that interfaces with database(s) at the server 200;
- a database 220, including one or more region tables 222, one or more base station tables 224, one or more tables of scan data 226, and one or more classifier tables 228. In some implementations, database 220 is a relational database; and
- a location module 230, which collects baseline region data in database 220, constructs formulas for identifying the region where an unknown point is located, and applying the constructed formulas to an unknown test point to estimate a likely region where the point is located. Some implementations utilize binary classifiers for each region, with each classifier indicating a likelihood that an unknown point is in the respective region. Some implementations utilize sequences of base station signal strengths and compare the sequences for baseline data to a new sequence at an unknown location. This is described in greater detail below in FIGS. 4A-4D, 5A, 5B, 6A-6C, 7A-7C, and 8A-8B. Once the estimated region for the client device 300 is determined, this information is stored in order to provide user presence information in an office application environment.

Each of the above identified elements may be stored in one or more of the previously mentioned memory devices, and corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various implementations. In some implementations, memory 210 may store a subset of the modules and data structures identified above. Furthermore, memory 210 may store additional modules and data structures not described above.

Although FIG. 2 shows a "server" 200, FIG. 2 is intended more as a functional description of the various features that may be present in a set of servers than as a structural schematic of the implementations described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a server 200 and how features are allocated among them will vary from one implementation to another, and may depend in part on the amount of data traffic that the system must handle during peak usage periods as well as during average usage periods.

Figure 3:
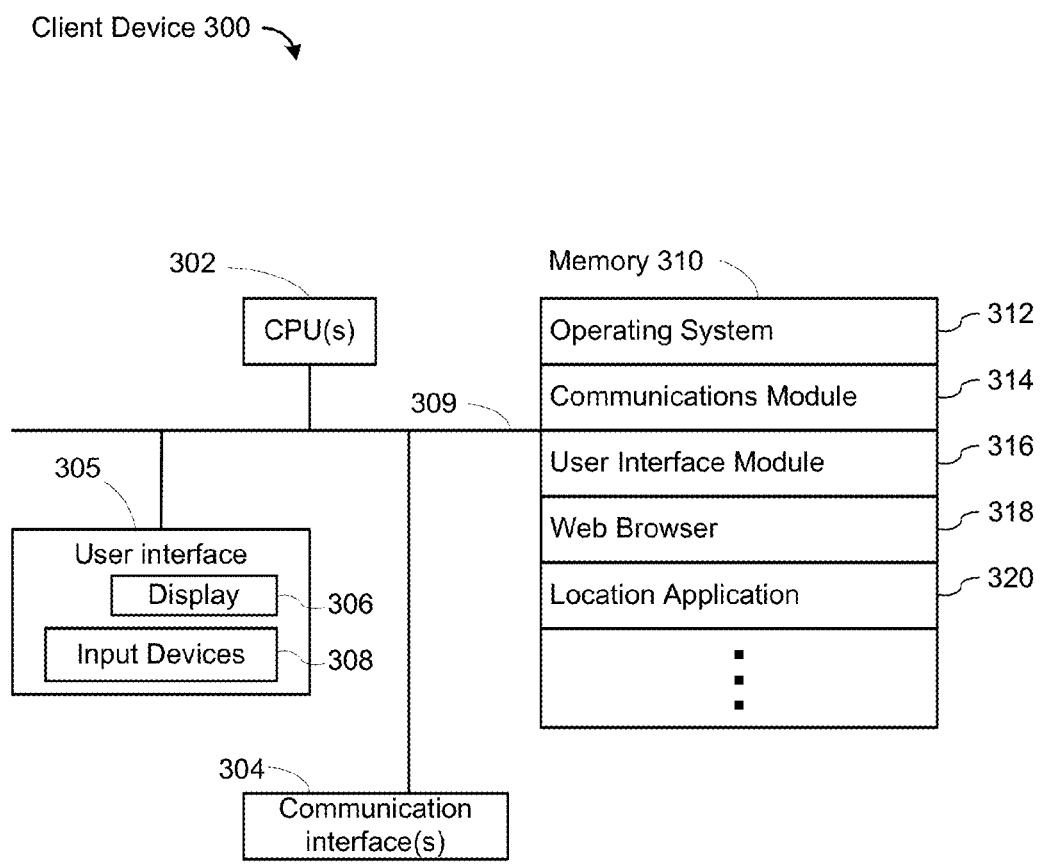
FIG. 3 is a block diagram illustrating a client device 300 in accordance with some implementations.

FIG. 3 is a block diagram illustrating a client device 300, according to some implementations. The client device 300 can be a desktop computer, laptop computer, a Smart Phone, or other mobile device that can connect to other computing devices over a communication network. The client device 300 typically includes one or more processing units (CPU's) 302, one or more network or other communications interfaces 304, memory 310, and one or more communication buses 309 for interconnecting these components. The communication buses 309 may include circuitry (sometimes called a chipset) that interconnects and controls communications between system components. The client device 300 also includes a user interface 305 comprising a display device 306 and input devices 308 (e.g., keyboard, mouse, touch screen, keypads, etc.). Memory 310 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 310 may optionally include one or more storage devices remotely located from the CPU(s) 302. Memory 310, or alternately the non-volatile memory device(s) within memory 310, comprises a computer readable storage medium. In some implementations, memory 310 stores the following programs, modules and data structures, or a subset thereof:

- an operating system 312 that includes procedures for handling various basic system services and for performing hardware dependent tasks;
- a communication module 314 that is used for connecting the client device 300 to other computer systems via the one or more communication interfaces 304 (wired or wireless) and one or more communication networks, such as the Internet, other wide area networks, local area networks, metropolitan area networks, and so on;
- a user interface module 316 that receives commands from the user via the input devices 308 and generates user interface objects in the display device 306;
- a web browser 318 that enables a user to access to access resources, web pages, and web applications over a communication network; and
- a location application 320, which executes to collect base station signal strength data as measured at the client device 300. In some implementations, the client device just collects the data and transmits the data to a server 200. The server 200 performs the calculations to estimate where the client device is located. In some implementations, the location application 320 estimates the location of the client device 300, and transmits the calculated location to a server 200. In general, it is other users who want to know the location of the client device 300, and thus the location of the device's owner, so the information must be sent to a server 200 in order to propagate that information to other users. In implementations where the location application 320 determines the probable region where the client device 300 is located, various methods are applied. Some embodiments compare the ordered list of WiFi base stations based on their signal strengths at the unknown location to ordered signal strength vectors at other known locations. In other implementations, the client device 300 receives classifier formulas from the server 200, and applies the formulas to the vector of signal strengths at the unknown location. Regardless of which computing device (client device 300 or server 200) estimates the location of the device 200, and regardless of which region identification method is applied, the server 200 ultimately has an estimate of where the region where device 300 is location, and updates its database so that others can see that information. This is described in more detail below with respect to FIGS. 4A-4D, 5A, 5B, 6A-6C, 7A-7C, and 8A-8B.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various implementations. In some implementations, memory 310 may store a subset of the modules and data structures identified above. Furthermore, memory 310 may store additional modules and data structures not described above.

Although FIG. 3 shows a client device 300, FIG. 3 is intended more as a functional description of the various features which may be present in a client device than as a structural schematic of the implementations described herein. In practice, and as recognized by those of ordinary skill in the art, items shown separately could be combined and some items could be separated.

Each of the methods described herein may be governed by instructions that are stored in a computer readable storage medium and that are executed by one or more processors of one or more servers or client devices. Each of the operations shown in FIGS. 2, 3, 7A-7C, and 8A-8B may correspond to instructions stored in a computer memory or computer readable storage medium.

Figure 4A:
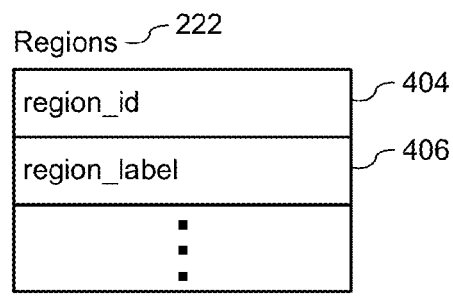
FIGS. 4A-4D illustrate example data structures for storing data used by disclosed implementations.
Figure 4C:
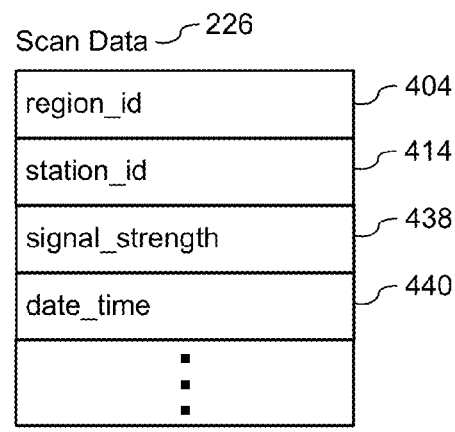

FIGS. 4A-4D are example data structures or tables that store data used by disclosed implementations. These data structures are typically stored at a server 200. FIG. 4A illustrates a Regions table 222, which includes a region_id 404, which is a unique identifier for the regions. In some implementations, the region_id is used only internally by programs, but in other implementations, the region_id is visible to users. In some implementations, the region_id is selected by a user when a new region is entered. The region_label is a user defined description for each region. For example, a value for a region_label could be "Room 411" or "Conference Room A." Typically, the region_label is editable, although region labels are not likely to change often.

In some implementations, additional information for regions is stored, such as a telephone number or room occupant.

Figure 4B:
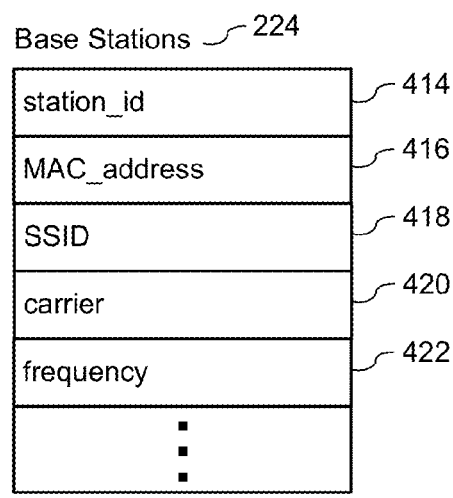

FIG. 4B illustrates an example data structure 224 for storing information about base stations. Typically the base stations are wireless routers or wireless access points. In order to be used by the disclosed implementations, a base station must deliver a wireless radio signal that can be detected by a client device 300. There are multiple ways to identify a base station. In many implementations, a MAC address (media access control address) 416 uniquely identifies each base station. In some implementations, each base station is assigned a unique station_id 414, which uniquely identifies each base station within the location identification system. Some implementations also store an SSID (service set identifier) 418, which is a public name for the wireless network corresponding to the base station. Whereas MAC address 416 and station_id are unique, the SSID 418 is not required to be unique.

In some implementations, the data for each base station also includes the carrier 420 and frequency 422.

In the disclosed implementations, base station signal strengths are measured at various known locations, and stored in the scan data table 226. Subsequently, that data is used to estimate an unknown location based on the signal strengths at that unknown location. The scan data table 226 includes measurements of base station signal strengths, with at least one scan point in each of the regions. Commonly, there will be several points in each room or region included in the scan data. In addition, because the base station signal strengths can vary over time, measurements in the same region are typically taken at various times of the day or days of the week. In this example scan data table 228, there is a separate record for each measurement of signal strength from a specific location at a specific time. Each record includes the region_id 404, or other identifier of the region where the measurement was taken. As noted earlier, only the region is tracked, not the "coordinates" of a point within the region. Each record also includes the station_id 414 of the base station from which the signal was received. In this example scan data structure 226, there is also a date/time stamp 440 indicating when the measurement was taken. In particular, there are typically several records with the same region_id 404 and station_id 414, so the date/time stamp 440 indicates when each of the measurements was made. In addition, the scan data structure 226 also includes the signal strength 438 of the signal received from the base station. In general, the signal strength is specified in decibel milliwatts (written as dbm, dBm, or dbmW).

Some implementations use the scan data to construct room/region classifiers, with one classifier for each region. A classifier is a function whose input is a vector of signal strengths taken at an unknown location. The output of a classifier is a number indicating the likelihood that the unknown location is in the corresponding region versus any other region. The classifiers are trained using the scan data in a greedy stagewise process. During each iteration, parameters are selected in order to minimize the weighted error of the training set. That is, during the training phase, the vectors from the scan data table 226 are used as input, and compared to the known locations of those scans. In some implementations, the classifiers are constructed in the form:

$$F(X) = \Sigma_m w_m h_m(X)$$

In this formula, X is a vector of base station signal strengths, m is a "feature," $w_m$ is the weight assigned to the feature, and $h_m(X)$ is a compare function. In some implementations, a feature is an ordered pair of base stations, whose value is the difference between the signal strengths received from the two base stations. In general, a "feature" can be any function of two or more base station signal strengths, or combination of other features. Each implementation specifies the types of features supported (e.g. polynomials of degree at most two with at most four base station signals), and performs the training based on the supported features. A compare function $h_m(X)$ has the format:

$$h_m(X) = \begin{cases} 1 & \text{if the feature value is} \geq \theta_m \\ 0 & \text{otherwise} \end{cases}$$

Of course, there are a lot of features that can be used by the classifiers. Even using only features that are the differences between the signal strengths of two base stations, n base stations creates n(n−1)/2 features. In general, a classifier uses only a small number of features—the ones that most clearly differentiate one region from all of the other regions.

Some implementations store the parameters for each classifier function in the classifiers table 228. In the example data structure in FIG. 4D, there is a record for each feature used by a classifier. The region_id 404 identifies the region to which the classifier applies. The coefficient 456 is the weight $w_m$ assigned to the feature. In this example data structure, the features are limited to differences between the signal strengths between two base stations, so in this structure station_id1 458 and station_id2 460 identify the ordered pair or base stations that form the feature. The threshold 462 is the value $\theta_m$ that is compared to the feature value. FIGS. 5A and 5B illustrate the usage of classifiers, and use classifiers that use the example structure illustrated in FIG. 4D. In implementations that support more complex classifiers, the data structure has additional fields.

Figure 4D:
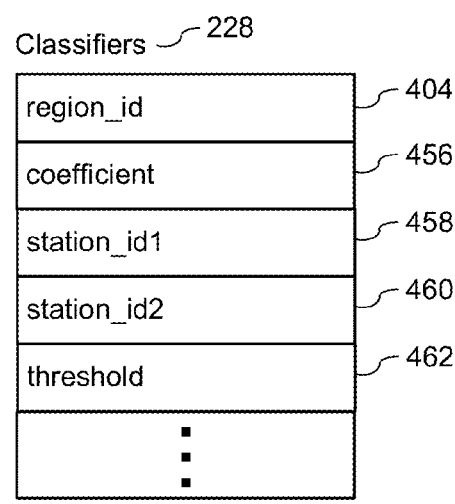

FIG. 5A illustrates data for two classifiers using the example classifiers table 228 illustrated in FIG. 4D. In this table, four features (AD, AF, AG, and BF) are used to form the classifier for the region with region_id 123, and three features (AC, AD, and BD) are used to form the classifier for the region with region_id 217. Note that the feature AD is used for both of these classifiers. The records 502-508 for the region with region_id 123 identify the features, weighting coefficients 456, and threshold comparison values 462. Similarly, the records 510-514 provide the parameters for the classifier for the region with region_id 217.

FIG. 5B provides sample base station signal strength data at some unknown point in the building. There are seven known base stations (A-G), although no signal was detected from base station G (record 538). Signal strength records 526-536 indicate the strengths of the signals received at base stations A-F, ranging from −34 dbm (the highest) to −98 dbm (the lowest measured signal strength).

The example data in FIGS. 5A and 5B illustrate several aspects of using classifiers to identify a region where a mobile device is located. First, not every base station or pair of base stations is required to be utilized by some classifier. For example, the base station E is not used by either of the classifiers here. Also, only a subset of the features are utilized. Second, the same feature (such as AD in records 502 and 512) may be used by two or more classifiers. Third, at some locations, a base station may not even be detectible, such as base station G at the unknown location specified by the data in FIG. 5B. For purposes of calculation, an undetected signal would be 0 strength, which is −∞ on the decibel milliwatt scale.

Using the data in FIGS. 5A and 5B, the classifier for the region with region_id 123 is computed as follows:
- $(-34)-(-50)=16$, which is not greater than 21, so $h_{AD}(X)=0$
- $(-34)-(-72)=38$, which is greater than 15, so $h_{AF}(X)=1$
- $(-34)-(-\infty)$ is greater than 17, so $h_{AG}(X)=1$
- $(-42)-(-72)=30$, which is greater than 8, so $h_{BF}(X)=1$ Therefore, $F_{123}(X)=(0.15\times0)+(0.12\times1)+(0.08\times1)+(0.03\times1)=0.23$.

Similarly, using the data in FIGS. 5A and 5B, the classifier for the region with region_id 217 is computed as follows:
- $(-34)-(-65)=31$, which is greater than 25, so $h_{AC}(X)=1$
- $(-34)-(-50)=16$, which is greater than 13, so $h_{AD}(X)=1$
- $(-42)-(-50)=8$, which is not greater than 11, so $h_{BD}(X)=0$ Therefore, $F_{217}(X)=(0.22\times1)+(0.13\times1)+(0.09\times0)=0.35$. In particular, the unknown location corresponding to vector X is more likely in the region corresponding to region_id 217 than in the region corresponding to region_id 123.

Some implementations extend the region classifiers in several ways. In some implementations, there are hierarchical levels of region classification, starting with a coarse level classification, with more specific classification at each subsequent level. In a hierarchical scheme, only a limited number of classifiers have to be evaluated at each level, because the higher level classification has already eliminated a large portion of the possibilities.

Some implementations factor in the time of day and/or day of week when signal strengths are measured. In these implementations, classifiers are constructed for various periods of time, and the appropriate classifiers are applied to test data based on when the test data is collected. For example, the baseline scan data may be broken into the time periods 7:00 AM to 9:00 AM, 9:00 AM to 11:30 AM, 11:30 AM to 1:30 PM, 1:30 PM to 6:00 PM, and 6:00 PM to 7:00 AM. For each region, a classifier is trained for each of these time periods. Then when an unknown location is to be classified, the classifiers for the appropriate time period are applied. One of skill in the art recognizes that other extensions and modifications can be readily applied to the basic methodology described here.

FIGS. 6A-6C illustrate an alternative process for determining a region or room where a mobile device is located. In this alternative process, the signal strengths of the base stations are ordered, both for the baseline scan data as well as the subsequent data collected at an unknown location. In FIG. 6A, the signal strengths in Room 315 are ordered B A C E H D G, whereas in Room 332, the signal strengths are ordered E C B G A. When an unknown or test sequence of signal strengths is collected, it can be compared to the known signal strength sequences. To measure the closeness of two sequences, disclosed implementations use various "edit distance" calculations. That is, how many atomic operations must be applied to get from one sequence to another. The known sequence that is closest to the test sequence is selected as the best estimate of the region where the mobile device is located. In some implementations, the atomic operations are: inserting a single element in the string; deleting a single element from the string; transposing a pair of adjacent elements; and replacing a single element with another element. Other implementations have more restrictive or more expansive definitions of the atomic operations, and some implementations require that any portion of the sequence is modified at most once.

FIGS. 6B and 6C illustrate the calculation of the edit distances from the strings for Rooms 315 and 332 to the string for an unknown location. The edit distance in FIG. 6B is 4, whereas the edit distance in FIG. 6C is 6 assuming the atomic operations are insert, delete, transpose, and replace. Therefore, the unknown location is more likely to be in Room 315 than Room 332.

The technique illustrated in FIGS. 6A-6C can be expanded in several ways. As noted earlier, the scan data 226 typically includes multiple points within each of the regions. Rather than finding the one nearest point as described above in FIGS. 6A-6C, some implementations find the k nearest points, where k is a positive integer. For example, k =5 in some implementations. In this instance, the five closest points (based on edit distance) are identified, and the region containing the greatest number of those points is the estimated region.

Some implementations combine string edit distance with Euclidean distance to get a more accurate estimate of which scanned data points are closest to an unknown test point. This is illustrated with respect to the data in records 652-666 in FIG. 6D. Some implementations use the $l^1$ norm, which sums the absolute values of the differences between the signal strengths; other implementations use the $l^2$ norm, which is the square root of the sums of the squares of the differences in signal strengths. When there are undetected signals at either the test location or in the scan data, implementations either ignore those base stations, or use a fixed number to represent an undetected signal (e.g., −128 dbm). Undetected signals can be due to the base station being offline at the time of a measurement, so implementations typically just exclude any base station that has a missing signal strength measurement. For the data in FIG. 6D, base stations D, F, and H will be excluded from the Euclidean distance because they were undetected at one or more of the points.

If we let C(X,Y) designate the $l^1$ norm, the Euclidean distances from the test point to Rooms 315 and 332 are:

$$C(\text{Test, Room 315})=|-55-(-34)|+|-50-(-42)|+|-60-(-65)|+|-70-(-74)|+|-80-(-89)|=21+8+5+4+9=47.$$

$$C(\text{Test, Room 332})=|-50-(-34)|+|-44-(-42)|+|-30-(-65)|+|-20-(-74)|+|-47-(-89)|=16+2+35+54+42=149.$$

Implementations that use Euclidean distance compute total distance d=(edit distance)+γ(Euclidean distance), where γ is a non-negative constant. Setting γ=0.10, we get d=4+0.10*47=8.7 for Room 315 and d=5+0.10*149=19.9 for Room 332. In this example, the edit distances (4 and 6) were similar, but by including the Euclidean distance, the algorithm concludes that Room 315 is much more likely than Room 332. At other points, inclusion of the Euclidean distance in the calculation can switch which point has the least total distance.

One important characteristic of a region determination technique is how well it scales to very large data sets. When using the string edit distance and the sequence of signal strengths, each test vector has to be compared to all of the scanned data points in order to identify the likely region for the test vector. The time required for this method is thus proportional to the number of regions. Furthermore, because a good data set will have multiple data points per region, the performance degrades noticeably as the number of data points increases. On the other hand, using classifiers has some distinct performance advantages. First, because the training phase computes the parameters for each of the classifiers, it is simple to apply the classifiers to test an unknown point. In addition, the classifiers are generally able to make the calculations based on a small number of features rather looking at the data from all base stations. Furthermore, as the number of regions increases, a hierarchical classification process efficiently scales, so that only a small number of classifiers are actually evaluated.

FIGS. 7A-7C and 8A-8B are flowcharts representing methods 700 and 800 performed by a location module 230 for determining the likely region where a mobile device is located according to certain implementations of the invention. Methods 700 and 800 are typically performed at a server 200, using instructions that are stored in a computer readable storage medium and that are executed by one or more processors of one or more servers. Each of the operations shown in FIGS. 7A-7C and 8A-8B may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

Figure 7B:
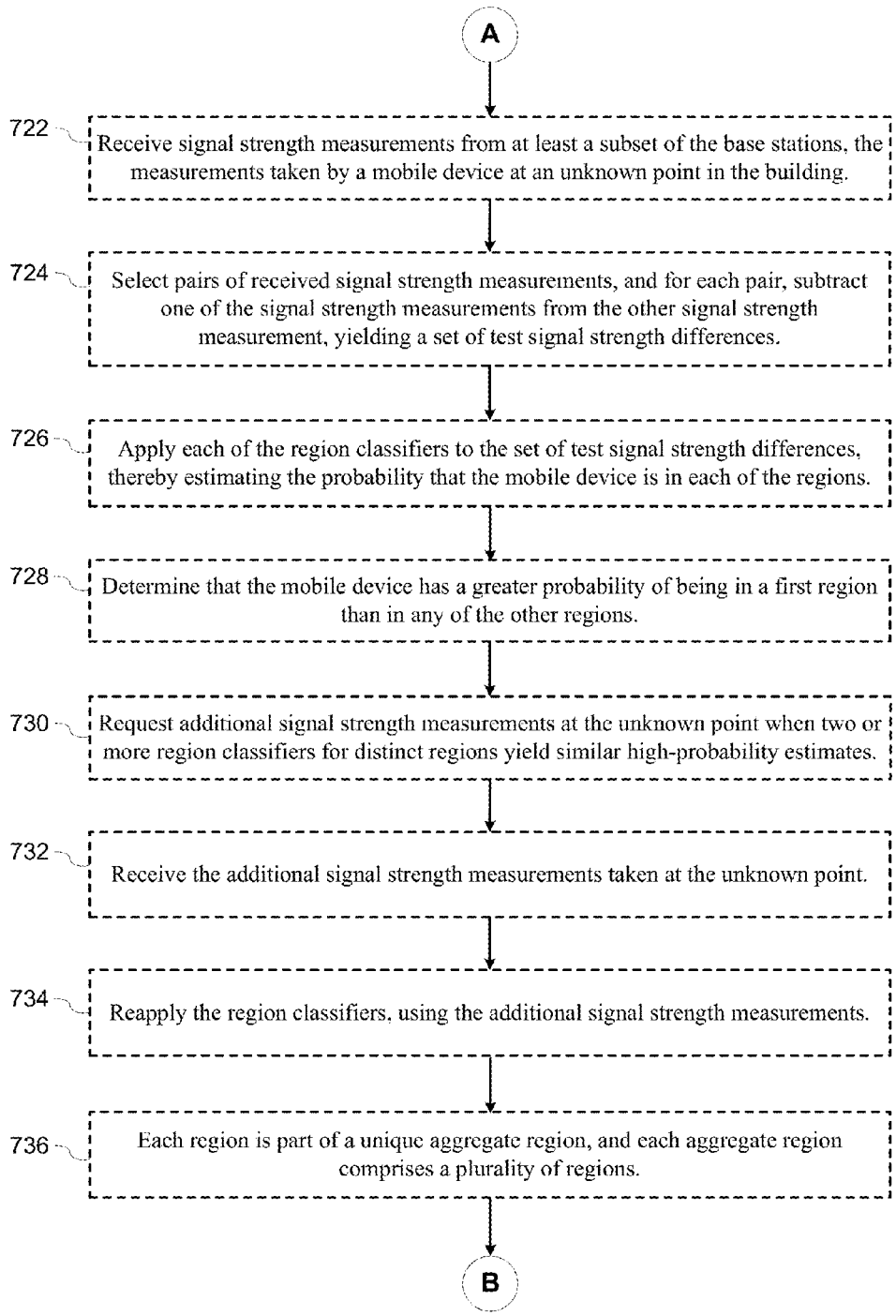
Figure 7C:
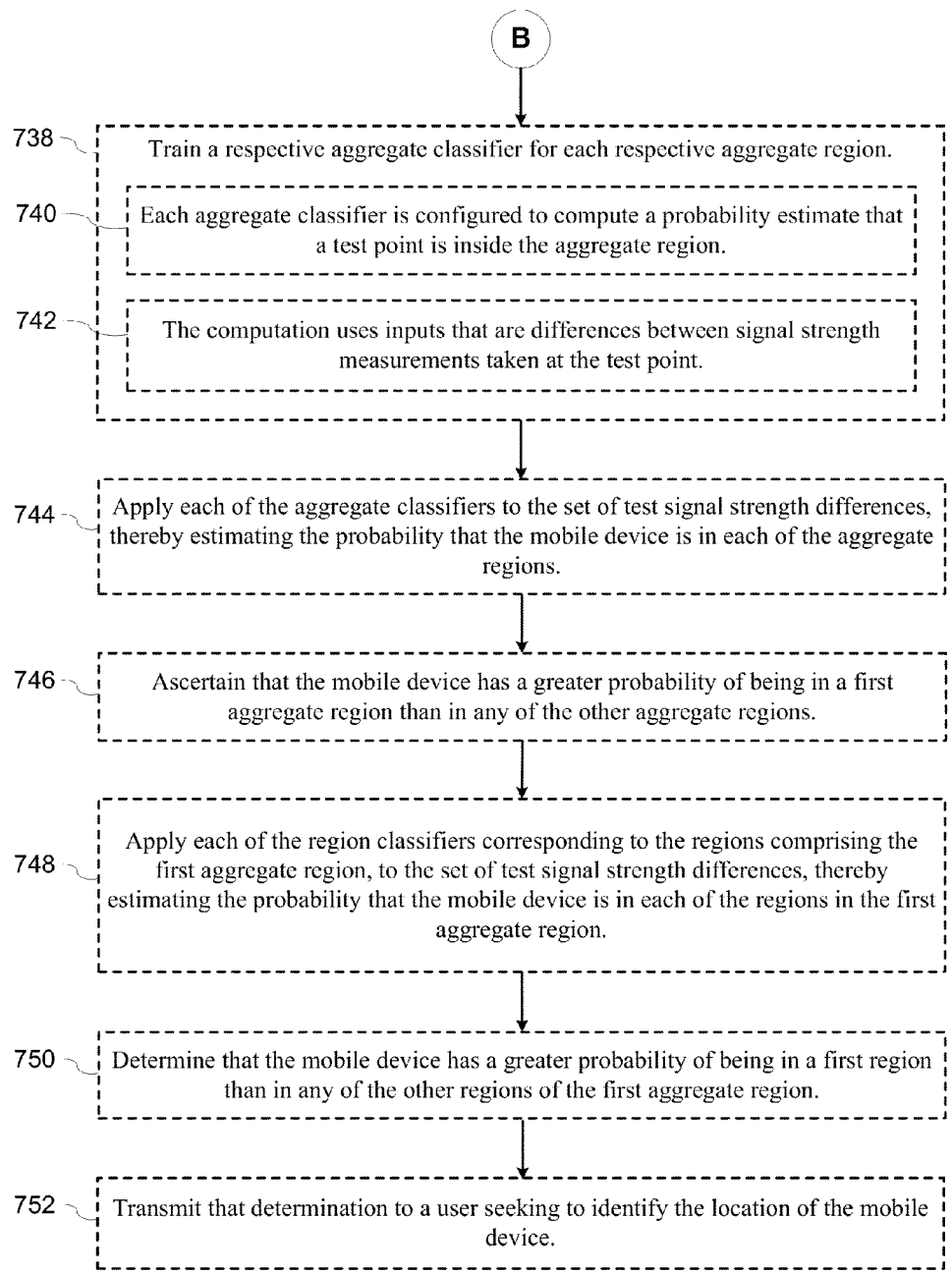

FIGS. 7A-7C are a flowchart illustrating some implementations that utilize classifiers to determine the most likely region where a mobile device is located. The process 700 executes (702) at a server having one or more processors and memory, in order to identify the probable location of a mobile device in a building. As noted earlier, because the owner of a mobile device typically keeps the mobile device close by, locating a mobile device acts as a proxy for locating the owner of the device. Before computing the location of a specific device, baseline data must be collected. The baseline data consists of base station signal strength measurements taken at known locations in a building. Generally, multiple measurements are taken within each region or room, at different places within the room and at different times. In some implementations, multiple measurements in the same room or regions are combined to form an average.

The server 200 receives (704) the base station signal strength measurements that were taken at a plurality of distinct points in the building. The radio signals were received (706) from a plurality of radio-transmitting base stations in the building. Generally, the radio signals are detected by a mobile testing device, and forwarded to the server. In some implementations, the relevant radio signals are limited to known fixed base stations that are under the control of a corporate entity. For example, if company ABC leases floors 5 and 6 of a very large office building, then the base stations may be limited to those operated by company ABC and physically located on floors 5 and 6 of the building. In some implementations, the selection of base stations is configurable, and not inherently limited to base stations belonging to a single corporate entity.

The building itself is partitioned (708) into a plurality of distinct regions. The partitioning typically corresponds to the layout of the rooms within the building, with each room designated as a "region." The regions are non-overlapping, but do not necessarily cover all of the floor space within a building. For example, a hallway may not be designated as part of any region. Of course walls are not the only way of designating regions. In some buildings there are very large open spaces split into cubicles or cubicle pods. In these environments, regions can be assigned in any manner that is meaningful. Furthermore, a large meeting room could be logically subdivided into smaller regions. Such a subdivision enables location of a mobile device (and thus a person) within those subdivisions. In order to differentiate between regions, there must be (710) at least on baseline measurement point in each of the regions.

Using the baseline received data, a region classifier is trained (712) for each of the regions. The training of classifiers is generally known to those of skill in the art, as illustrated, for example, in the paper "Robust LogitBoost and Adaptive Base Class (ABC) LogitBoost" by Ping Li, submitted Mar. 15, 2012. Each region classifier is configured (714) to compute a probability estimate that a test point is inside the corresponding region. In some implementations, the computation performed by each classifier uses (716) inputs that are differences between signal strength measurements taken at the test point. This is illustrated above in FIGS. 5A and 5B. The measurements are (716) for signals received from the base stations.

In some implementations, the region classifiers compute their probabilities in a specific way. For example, in some implementations, one or more of the region classifiers is configured (718) to compute probability estimates according to a calculation formula of the form $F(X)=\Sigma_m w_m h_m(X)$, where m ranges over a respective set of features (e.g., base station pairs), each $w_m$ is a non-negative real number, X is a variable representing a set of test signal strength measurements, and each $h_m(X)$ is 1 or 0 depending on whether the difference between signal strengths from the corresponding pair of base stations is greater than a corresponding threshold value $\theta_m$. In some implementations, the training comprises (720) iteratively selecting parameters that minimize the total error for the training set. For example, the values of the parameters $w_m$ and $\theta_m$ are iteratively modified to produce the best estimates for the training set.

After the classifiers are trained, they can be applied to estimate the region where a device is located. As noted previously, the goal is to identify the region where the mobile device is located, not to calculate coordinates of the mobile device. The server 200 receives (722) signal strength measurements from at least a subset of the base stations, where the measurements were taken by a mobile device at an unknown point in the building. The server selects (724) pairs of received signal strength measurements, and for each pair, subtracts one of the signal strength measurements from the other signal strength measurement. Applying this to each selected pair yields (724) a set of test signal strength differences. Each classifier utilizes only a subset of the total possible combinations, so the signal strength differences are calculated only for the pairs actually used by one or more classifiers. For example, with 20 base stations, there are 20*19 ordered pairs, which is 380 possible differences. In practice, the classifiers might only use 40 or 50 of these 380 ordered pairs.

The server 200 applies (726) each of the region classifiers to the set of signal strength differences, thereby estimating the probability that the mobile device is in each of the regions. In some instances, the server determines (728) that the mobile device has a greater probability of being in a first region than in any other region, and transmits (752) that determination to a user seeking to identify the location of the mobile device. In some instances, there are two or more classifiers that field nearly the same probability. In some implementations, the server 200 requests (730) additional signal strength measurements at the unknown point when two or more region classifiers for distinct regions yield similar high-probability estimates. In these cases, the mobile device takes additional measurements, and returns them to the server 200. The server 200 receives (732) the additional signal strength measurements taken at the unknown point, and reapplies (734) the region classifiers, using the additional signal strength measurements. In some implementations, only the region classifiers that yielded the high probabilities the first time around are computed in the second (or subsequent) round.

Some implementations support hierarchical classifiers, which is particularly useful for large buildings. In a hierarchical approach, a first level of classifiers is applied as a coarse filter. For example, suppose a company has offices on floors 8-13 of a building. At the first level, there could be six classifiers, one of each of the floors. Once the floor is identified, the second level of classifiers could be applied to identify the region (or room) on the appropriate floor. This process is much more efficient than applying all of the classifiers for all of the floors in a single pass. Of course floors of a building are not the only way to utilize a hierarchical classification structure. Even a large single floor of a building could be subdivided, such as North, South, East, and West. As used herein, an aggregate region is a "super" region formed by combining two or more regions. Thus, in the examples above, an aggregate region could be a floor of a building or any other meaningful division of a building that includes more than one region.

In some implementations, each region is (736) part of a unique aggregate region, and each aggregate region comprises a plurality of regions. The server trains (738) a respective aggregate classifier for each respective aggregate region. This training is similar to the training of the individual regions. Each aggregate classifier is configured (740) to compute a probability estimate that a test point is inside the aggregate region. In some implementations, the aggregate classifiers use (742) inputs that are differences between signal strength measurements taken at the test point. Just like the region classifiers, aggregate classifiers can use features that are more complex than the difference between a pair of signal strengths. The server 200 applies (744) each of the aggregate classifiers to the set of test signal strength differences, thereby estimating the probability that the mobile device is in each of the aggregate regions.

The server 200 ascertains (746) that the mobile device has a greater probability of being in a first aggregate region than in any of the other aggregate regions, and then applies (748) only the region classifiers corresponding to the regions comprising the first aggregate region. These region classifiers are applied (748) to the set of test signal differences, thereby estimating the probability that the mobile device is in each of the regions in the first aggregate region. The server 200 then determines (750) that the mobile device has a greater probability of being in a first region than in any other region of the first aggregate region, and transmits (752) that determination to a user seeking to identify the location of the mobile device.

Although aggregate regions are described here with respect to a two-level hierarchy, the same process can be applied with three or more levels. At the last level, the classifiers identify a specific region where the mobile device is estimated to be located; at all earlier levels, the coarse classification limits the set of classifiers that will be applied at the next level.

Figure 8A:
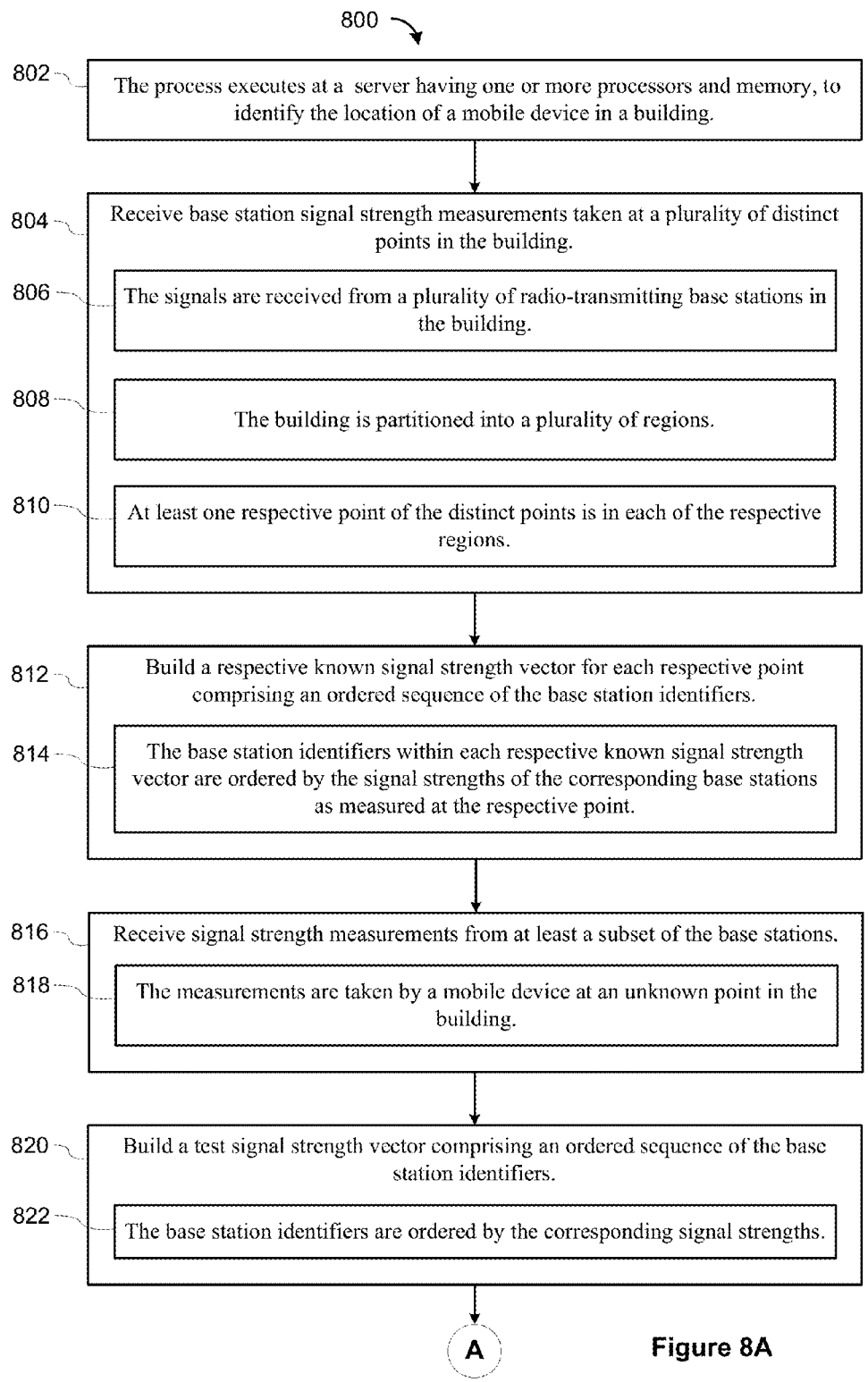
FIGS. 8A-8B illustrate an alternative flowchart for determining the room or region where a mobile device is located in accordance with some implementations.
Figure 8B:
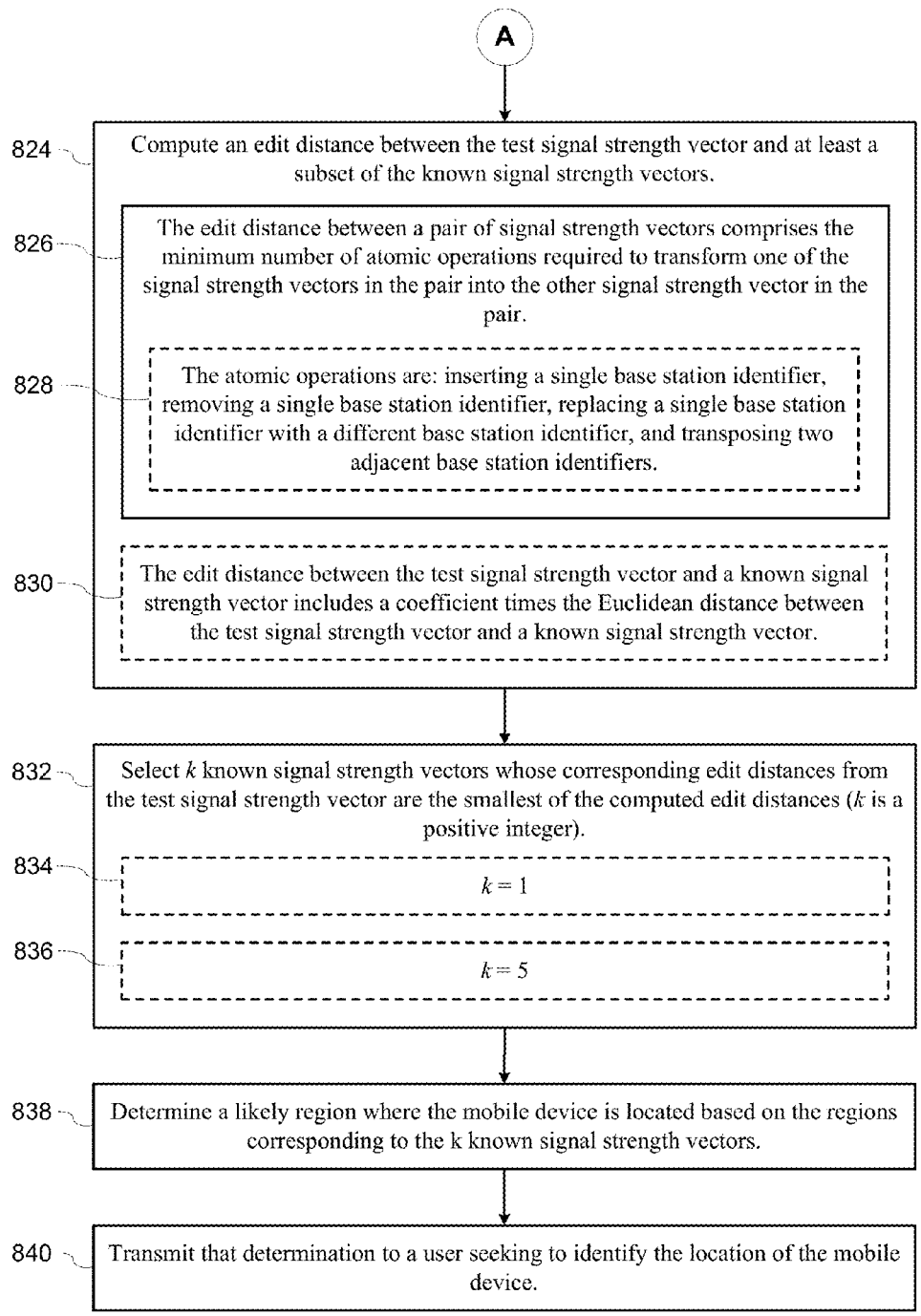

FIGS. 8A-8B are a flowchart illustrating some implementations that utilize edit distance between sequences of signal strengths to determine the most likely region where a mobile device is located. The process 800 executes (802) at a server having one or more processors and memory, in order to identify the probable location of a mobile device in a building. Before computing the location of a specific device, baseline data must be collected. The baseline data consists of base station signal strength measurements taken at known locations in a building. Generally, multiple measurements are taken within each region or room, at different places within the room and at different times. In some implementations, multiple measurements in the same room or regions are combined to form an average.

The server 200 receives (804) the base station signal strength measurements that were taken at a plurality of distinct points in the building. The radio signals were received (806) from a plurality of radio-transmitting base stations in the building. Generally, the radio signals are detected by a mobile testing device, and forwarded to the server. In some implementations, the relevant radio signals are limited to known fixed base stations that are under the control of a corporate entity.

The building is partitioned (808) into a plurality of distinct regions. The partitioning typically corresponds to the layout of the rooms within the building, with each room designated as a "region." The regions are non-overlapping, but do not necessarily cover all of the floor space within a building. For example, a hallway may not be designated as part of any region. Of course walls are not the only way of designating regions. In some buildings there are very large open spaces split into cubicles or cubicle pods. In these environments, regions can be assigned in any manner that is meaningful. Furthermore, a large meeting room could be logically subdivided into smaller regions. Such a subdivision enables location of a mobile device (and thus a person) within those subdivisions. In order to differentiate between regions, there must be (810) at least on baseline measurement point in each of the regions.

The server 200 builds (812) a known signal strength vector for each point. A known signal strength vector is (812) an ordered sequence of base station identifiers. The base station identifiers within each known signal strength vector are ordered (814) by the signal strengths of the corresponding base stations as measured at each point.

The server then uses the known signal strength vectors to identify the probable region where a mobile device is located. The server receives (816) signal strength measurements from at least a subset of the base stations, which were taken (818) by the mobile device at an unknown location in the building. The server builds (820) a test signal strength vector comprising an ordered sequence of the base station identifiers, where the base station identifiers are ordered (822) by the corresponding signal strengths as measured by the mobile device at the unknown location.

The server 200 then determines which of the known signal strength vectors are closest to the test signal strength vector, and estimates the region where the mobile device is located based on the known region corresponding to each of the known signal strength vectors. The server 200 computes (824) an edit distance between the test signal strength vector and at least a subset of the known signal strength vectors. The edit distance between a pair of signal strength vectors is (826) the minimum number of atomic operations required to transform one of the signal strength vectors in the pair into the other signal strength vector in the pair. In some implementations, the atomic operations are (828): inserting a single base station identifier, removing a single base station identifier, replacing a single base station identifier with a different base station identifier, and transposing two adjacent base station identifiers. This is illustrated above with respect to FIGS. 6A-6D. In some implementations, the edit distance is combined with the Euclidean distance (e.g., $l^1$ or $l^2$) to get a more accurate estimate of which known signal strength vectors are the closest. In these implementations, the edit distance between the test signal strength vector and a known signal strength vector includes (830) a coefficient times the Euclidean distance between the test signal strength vector and a known signal strength vector.

The server 200 then selects (832) the k known signal strength vectors whose corresponding edit distances from the test signal strength vector are the smallest of the computed edit distances, where k is a fixed positive integer. In some implementations (834), k=1, and in some implementations (836) k=5. The server 200 determines (838) a likely region where the mobile device is located based on the regions corresponding to the k known signal strength vectors. For example, when k=1, the region where the one closest known signal strength vector is located is identified as the likely region. The server then transmits (840) that determination to a user seeking to identify the location of the mobile device.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of identifying locations of mobile devices in buildings, performed at a server having one or more processors and memory, the method comprising:
   partitioning a building into a plurality of regions, wherein the building includes a plurality of radio-transmitting base stations at distinct locations;
   receiving training data measurements taken at a plurality of distinct points in the building, wherein for each of the distinct points the measurements measure strength of signals received from the base stations, and wherein at least one respective point of the distinct points is in each of the respective regions;
   for each respective point of the plurality of distinct points in the building, computing differences between pairs of signal strength measurements taken at the respective point and forming a respective feature vector that includes a plurality of components, each component comprising a respective computed difference associated with a respective base station pair, thereby forming a plurality of feature vectors; and
   for each region, using the feature vectors to train a respective region classifier, wherein the training includes selecting a respective subset of the base station pairs that consists of fewer than all base station pairs and determining a respective plurality of parameters corresponding to the respective subset of base station pairs, and wherein the respective plurality of parameters are modified during the training so that the respective region classifier computes probability estimates that test points are inside the respective region using sample feature vectors of signal strength differences for signal strength measurements taken at the test points for signals received from the base stations.

2. The method of claim 1, wherein the selected subset of base station pairs for a first region is M, and the respective plurality of parameters for the corresponding first region classifier F includes, for each m ∈ M, a numeric weight $w_m$ and a threshold value $\theta_m$; and wherein F has a calculation formula of the form $$F(X) = \sum_{m \in M} w_m h_m(X),$$

where X is a variable representing a set of test signal strength measurements for signals from the base stations as measured at an unknown point in the building, and each $h_m(X)$ is 1 or 0 depending on whether a computed difference between signal strengths from the pair of base stations in m is greater than the threshold value $\theta_m$.

3. The method of claim 1, wherein training the region classifiers comprises iteratively selecting parameters that minimize total error for the training set.

4. The method of claim 1, further comprising:
   receiving sample signal strength measurements from at least a subset of the base stations, wherein the sample signal strength measurements are taken by a mobile device at an unknown point in the building;
   selecting pairs of received sample signal strength measurements, and for each pair, subtracting one of the sample signal strength measurements in the pair from the other sample signal strength measurement in the pair, yielding a set of test signal strength differences;
   applying each of the region classifiers to the set of test signal strength differences, thereby estimating the probability that the mobile device is in each of the regions;
   determining that the mobile device has a greater probability of being in a first region than in any of the other regions; and
   transmitting that determination to a user seeking to identify the location of the mobile device.

5. The method of claim 4, further comprising:
   requesting additional signal strength measurements at the unknown point when two or more of the region classifiers for distinct regions yield similar high-probability estimates;
   receiving the additional signal strength measurements taken at the unknown point; and
   reapplying at least a subset of the region classifiers using the additional signal strength measurements.

6. The method of claim 1, wherein each region is part of a unique aggregate region of a plurality of aggregate regions, and each aggregate region of the plurality of aggregate regions comprises a plurality of regions, the method further comprising:
   training a respective aggregate classifier for each respective aggregate region, wherein each aggregate classifier is configured to compute a probability estimate that a test point is inside the aggregate region, the computation using inputs that are differences between signal strength measurements taken at the test point for signals received from the base stations.

7. The method of claim 6, further comprising:
   receiving sample signal strength measurements from at least a subset of the base stations, the sample signal strength measurements taken by a mobile device at an unknown point in the building;
   selecting pairs of received sample signal strength measurements, and for each pair, subtracting one of the sample signal strength measurements in the pair from the other sample signal strength measurement in the pair, yielding a set of test signal strength differences;

applying each of the aggregate classifiers to the set of test signal strength differences, thereby estimating the probability that the mobile device is in each of the aggregate regions;

ascertaining that the mobile device has a greater probability of being in a first aggregate region than in any of the other aggregate regions; and applying each of the region classifiers corresponding to the regions comprising the first aggregate region, to the set of test signal strength differences, thereby estimating the probability that the mobile device is in each of the regions in the first aggregate region;

determining that the mobile device has a greater probability of being in a first region than in any of the other regions of the first aggregate region; and transmitting that determination to a user seeking to identify the location of the mobile device.

8. The method of claim 1, wherein training each respective region classifier further includes determining a respective weight for each base station pair of the respective selected subset of base station pairs.

9. A system for determining regions in buildings where mobile devices are located, comprising:

one or more processors;

memory; and one or more programs stored in the memory, the one or more programs comprising instructions for:

partitioning a building into a plurality of regions, wherein the building includes a plurality of radio-transmitting base stations at distinct locations;

receiving training data measurements taken at a plurality of distinct points in the building, wherein for each of the distinct points the measurements measure strength of signals received from the base stations, and wherein at least one respective point of the distinct points is in each of the respective regions;

for each respective point of the plurality of distinct points in the building, computing differences between pairs of signal strength measurements taken at the respective point and forming a respective feature vector that includes a plurality of components, each component comprising a respective computed difference associated with a respective base station pair, thereby forming a plurality of feature vectors; and for each region, using the feature vectors to train a respective region classifier, wherein the training includes selecting a respective subset of the base station pairs that consists of fewer than all base station pairs and determining a respective plurality of parameters corresponding to the respective subset of base station pairs, and wherein the respective plurality of parameters are modified during the training so that the respective region classifier computes probability estimates that test points are inside the respective region using feature vectors of signal strength differences for signal strength measurements taken at the test points for signals received from the base stations.

10. The system of claim 9, wherein the selected subset of base station pairs for a first region is M, and the respective plurality of parameters for the corresponding first region classifier F includes, for each m ∈ M, a numeric weight $w_m$ and a threshold value $\theta_m$; and wherein F has a calculation formula of the form $$F(X) = \sum_{m \in M} w_m h_m(X),$$

where X is a variable representing a set of test signal strength measurements for signals from the base stations as measured at an unknown point in the building, and each $h_m(X)$ is 1 or 0 depending on whether a computed difference between signal strengths from the pair of base stations in m is greater than the threshold value $\epsilon_m$.

11. The system of claim 9, wherein instructions for training the region classifiers comprise instructions for iteratively selecting parameters that minimize total error for the training set.

12. The system of claim 9, the one or more programs further comprising instructions for:

receiving sample signal strength measurements from at least a subset of the base stations, wherein the sample signal strength measurements are taken by a mobile device at an unknown point in the building;

selecting pairs of received sample signal strength measurements, and for each pair, subtracting one of the sample signal strength measurements in the pair from the other sample signal strength measurement in the pair, yielding a set of test signal strength differences;

applying each of the region classifiers to the set of test signal strength differences, thereby estimating the probability that the mobile device is in each of the regions;

determining that the mobile device has a greater probability of being in a first region than in any of the other regions; and transmitting that determination to a user seeking to identify the location of the mobile device.

13. The system of claim 12, the one or more programs further comprising instructions for:

requesting additional signal strength measurements at the unknown point when two or more of the region classifiers for distinct regions yield similar high-probability estimates;

receiving additional signal strength measurements taken at the unknown point; and reapplying at least a subset of the region classifiers using the additional signal strength measurements.

14. The system of claim 9, wherein each region is part of a unique aggregate region of a plurality of aggregate regions, and each aggregate region of the plurality of aggregate regions comprises a plurality of regions, the one or more programs further comprising instructions for:

training a respective aggregate classifier for each respective aggregate region, wherein each aggregate classifier is configured to compute a probability estimate that a test point is inside the aggregate region, the computation using inputs that are differences between signal strength measurements taken at the test point for signals received from the base stations.

15. The system of claim 14, the one or more programs further comprising instructions for:

receiving sample signal strength measurements from at least a subset of the base stations, the sample signal strength measurements taken by a mobile device at an unknown point in the building;

selecting pairs of received sample signal strength measurements, and for each pair, subtracting one of the sample signal strength measurements in the pair from the other sample signal strength measurement in the pair, yielding a set of test signal strength differences;

applying each of the aggregate classifiers to the set of test signal strength differences, thereby estimating the probability that the mobile device is in each of the aggregate regions;

ascertaining that the mobile device has a greater probability of being in a first aggregate region than in any of the other aggregate regions; and applying each of the region classifiers corresponding to the regions comprising the first aggregate region, to the set of test signal strength differences, thereby estimating the probability that the mobile device is in each of the regions in the first aggregate region;

determining that the mobile device has a greater probability of being in a first region than in any of the other regions of the first aggregate region; and transmitting that determination to a user seeking to identify the location of the mobile device.

16. A non-transitory computer readable storage medium storing one or more programs configured for execution by a computer, the one or more programs comprising instructions for:

partitioning a building into a plurality of regions, wherein the building includes a plurality of radio-transmitting base stations at distinct locations;

receiving training data measurements taken at a plurality of distinct points in the building, wherein for each of the distinct points the measurements measure strength of signals received from the base stations, and wherein at least one respective point of the distinct points is in each of the respective regions;

for each respective point of the plurality of distinct points in the building, computing differences between pairs of signal strength measurements taken at the respective point and forming a respective feature vector that includes a plurality of components, each component comprising a respective computed difference associated with a respective base station pair, thereby forming a plurality of feature vectors; and for each region, using the feature vectors to train a respective region classifier, wherein the training includes selecting a respective subset of the base station pairs that consists of fewer than all base station pairs and determining a respective plurality of parameters corresponding to the respective subset of base station pairs, and wherein the respective plurality of parameters are modified during the training so that the respective region classifier computes probability estimates that test points are inside the respective region using sample feature vectors of signal strength differences for signal strength measurements taken at the test points for signals received from the base stations.

17. The computer readable storage medium of claim 16, wherein the selected subset of base station pairs for a first region is M, and the respective plurality of parameters for the corresponding first region classifier F includes, for each m ∈ M, a numeric weight $w_m$ and a threshold value $\theta_m$; and wherein F has a calculation formula of the form $$F(X) = \Sigma_{m \in M} w_m h_m(X),$$

where X is a variable representing a set of test signal strength measurements for signals from the base stations as measured at an unknown point in the building, and each $h_m(X)$ is 1 or 0 depending on whether a computed difference between signal strengths from the pair of base stations in m is greater than the threshold value $\theta_m$.

18. The computer readable storage medium of claim 16, the one or more programs further comprising instructions for:

receiving sample signal strength measurements from at least a subset of the base stations, wherein the sample signal strength measurements are taken by a mobile device at an unknown point in the building;

selecting pairs of received sample signal strength measurements, and for each pair, subtracting one of the sample signal strength measurements in the pair from the other sample signal strength measurement in the pair, yielding a set of test signal strength differences;

applying each of the region classifiers to the set of test signal strength differences, thereby estimating the probability that the mobile device is in each of the regions;

determining that the mobile device has a greater probability of being in a first region than in any of the other regions; and transmitting that determination to a user seeking to identify the location of the mobile device.

19. The computer readable storage medium of claim 18, the one or more programs further comprising instructions for:

requesting additional signal strength measurements at the unknown point when two or more of the region classifiers for distinct regions yield similar high-probability estimates;

receiving the additional signal strength measurements taken at the unknown point; and reapplying at least a subset of the region classifiers using the additional signal strength measurements.

20. The computer readable storage medium of claim 16, wherein each region is part of a unique aggregate region of a plurality of aggregate regions, and each aggregate region of the plurality of aggregate regions comprises a plurality of regions, the one or more programs further comprising instructions for:

training a respective aggregate classifier for each respective aggregate region, wherein each aggregate classifier is configured to compute a probability estimate that a test point is inside the aggregate region, the computation using inputs that are differences between signal strength measurements taken at the test point for signals received from the base stations.

21. The computer readable storage medium of claim 20, the one or more programs further comprising instructions for:

receiving sample signal strength measurements from at least a subset of the base stations, the sample signal strength measurements taken by a mobile device at an unknown point in the building;

selecting pairs of received sample signal strength measurements, and for each pair, subtracting one of the sample signal strength measurements in the pair from the other sample signal strength measurement in the pair, yielding a set of test signal strength differences;

applying each of the aggregate classifiers to the set of test signal strength differences, thereby estimating the probability that the mobile device is in each of the aggregate regions;

ascertaining that the mobile device has a greater probability of being in a first aggregate region than in any of the other aggregate regions; and applying each of the region classifiers corresponding to the regions comprising the first aggregate region, to the set of test signal strength differences, thereby estimating the probability that the mobile device is in each of the regions in the first aggregate region;

determining that the mobile device has a greater probability of being in a first region than in any of the other regions of the first aggregate region; and transmitting that determination to a user seeking to identify the location of the mobile device.

* * * * *